Figures 1, 2, 3:
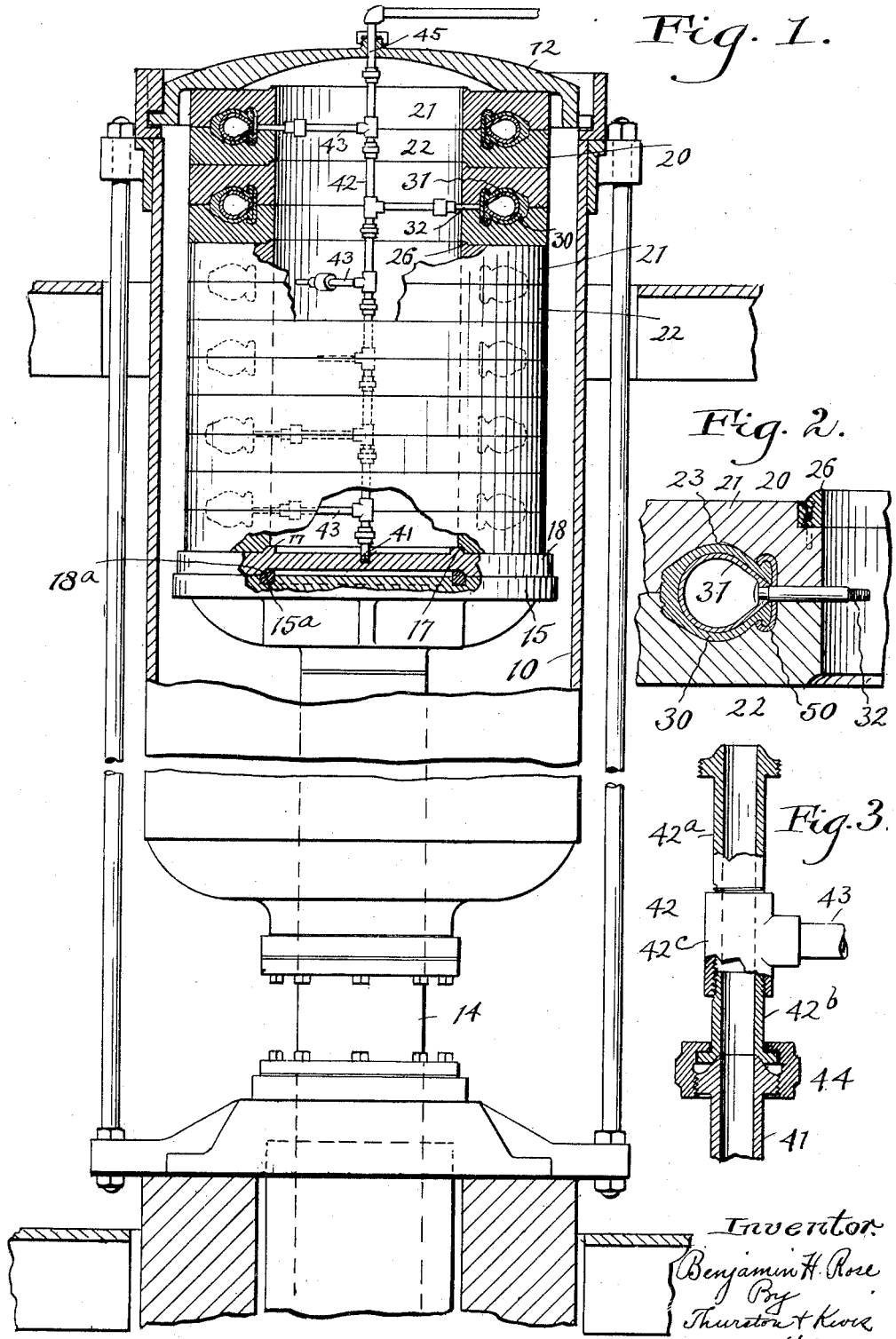

B. H. ROSE.
TIRE VULCANIZING MECHANISM.
APPLICATION FILED FEB. 20, 1919.

1,362,189.

Patented Dec. 14, 1920.

Inventor
Benjamin H. Rose
By
Thurston & Kwis
attys.

UNITED STATES PATENT OFFICE.

BENJAMIN H. ROSE, OF LAKEWOOD, OHIO.

TIRE-VULCANIZING MECHANISM.

1,362,189.  Specification of Letters Patent.  Patented Dec. 14, 1920.

Application filed February 20, 1919. Serial No. 278,193.

*To all whom it may concern:*

Be it known that I, BENJAMIN H. ROSE, a citizen of the United States, residing at Lakewood, in the county of Cuyahoga and State of Ohio, have invented a certain new and useful Improvement in Tire-Vulcanizing Mechanism, of which the following is a full, clear, and exact description.

The common method of procedure for effecting the vulcanizing of certain kinds of pneumatic tire casings, is as follows:

An uncured tire casing, with a deflated air tube in it, is mounted on a metal rim, and the resulting structure is placed in the mold cavity of an annular two-part mold with the valve stem of the inner tube projecting out of the mold toward the axis thereof. The molds are then put one by one into a so-called heater press; and when they are so put in, the top and bottom halves of the molds are not secured together. The first mold put into the press is supported upon the head of a hydraulically operated ram which extends upward through the bottom of the heater cylinder, and, when the first mold is put in, this head is substantially on a level with the top edge of the cylinder. After one mold has been put in, the ram is lowered a distance substantially equal to the thickness of the mold; and then another mold is put into the heater resting upon the first mold. This practice is continued until the heater is substantially full,—the ram head being lowered as stated after each mold is put in. After each mold is put into the heater a connection is made between the valve stem of the air tube therein and a fluid pressure supply pipe through which the air tube may be inflated. When these connections have been made the top of the heater is applied to and secured upon the cylinder, and the ram is forced upward until the pile of molds are clamped together between the ram head and the heater top, thereby preventing any separation of the halves of the molds. It is only after the molds are so clamped that the air tubes can be inflated. After the inflation of the air tubes, steam is admitted to the heater to provide the heat required for vulcanizing.

The filling of the heater with these molds, and the connecting of the air valve stems with the fluid pressure supply pipe takes a long time, and in the apparatuses which have heretofore been used, it has been necessary to use pipe connections which must not only be flexible but must also be variable in length. The use of these flexible air pipe connections of variable length is objectionable because of the time it takes to bend them and pull them into the required position, but it is more objectionable because these connections are expensive, and short lived, and require frequent renewal.

The object of the present invention is to reduce the labor incident to connecting the several air tubes with a fluid pressure supply pipe; to avoid the use of expensive and short lived fluid pressure connections; and generally to reduce the cost of the performing operations above referred to.

With that end in view, the invention consists primarily in providing the molds with means for accurately centering them one upon another, which means do not interfere with the engagement of the substantially flat top and bottom surfaces with one another. The invention also involves the provision on the top of the ram heads of a centering device for accurately centering the first mold put into the heater. The invention also involves the use of a sectional vertical fluid supply pipe the lower section of which is fixed axially to the ram head, and in building that air pipe up in an axial position by the addition of pipe sections and intermediate coupling devices which connect the sections together in alinement. each air pipe section being provided with a radially extended pipe carrying on its outer end means by which it can be connected with an air valve. By centering the molds upon the ram head and upon one another all of the molds will have a common axis; by building up the fluid pressure pipe in this axis the distance from the pipe to the valve stems will always be the same, regardless of whether the valve stems of the successive molds point toward the center from one direction or another.

An embodiment of this entire invention is shown in the drawing, in which Figure 1 represents a side elevation, partly sectioned, of a heater press filled with molds, some of which are shown in section, which molds are clamped together between the cover of the press and vertically movable ram head: Fig. 2 is a radial section through one side of a filled mold; and Fig. 3 is a side elevation partly sectioned of a part of the axially disposed fluid pressure supply pipe.

Referring to the parts by reference characters, 10 represents the cylinder of the heater press, 12 the removable cover plate thereof, 14 represents a hydraulically operated ram which extends vertically up through the bottom of the heater; and 15 represents the head of the ram within the heater.

Each mold 20 is composed of an upper half 21 and lower half 22. In the meeting faces of the mold halves is the mold recess 23. A tire casing 30 with an air tube 31 in it is mounted on a rim 50; and the resulting structure, is placed in the mold recess in the lower half of the mold. The upper half of the mold is then set on, but the two halves of the mold are not bolted together. The valve stem extends radially out of the mold toward the axis of the mold, in a groove between the upper and lower halves thereof. The upper and lower halves of each are formed with centering devices which, when one mold is placed upon another will facilitate the accurate placement of said molds so that their axes will be coincident. The drawing shows a thoroughly practical and so far as I know, the best form of mold centering devices. The upper half of each mold is provided adjacent its inner periphery with an upwardly extended annular rib 26, the outer edge of which is preferably beveled. In the lower surface of the bottom half of the mold adjacent the central opening therethrough is an annular recess to which said rib is fitted, the wall of said groove being beveled, so that it will easily receive, and accurately fit the beveled rib. An annular beveled centering rib 17 is also formed on the top surface of the ram head. Therefore, as the molds are successively put into the heating cylinder the first mold will come to rest on the ram head with the centering rib 17 thereof entering the annular groove in the lower face of said mold. To adapt the heater press for use in vulcanizing tires of different sizes, the top of the ram head is formed of a removable plate 18. The plate in use must have its centering rib of the size required for coöperation with the particular mold which rests upon it. The next mold when it is put into the heater cylinder will be centered upon the mold beneath it by the engagement of the centering ring 26 of the lower mold in the annular centering groove in the lower face of the upper mold. And therefore the valve stems 32, regardless of whether they project toward the axis of the cylinder from one direction or another, will all be equidistant from the axis of the cylinder, which is likewise the axis of the pile of molds.

To supply to the various air tubes the pressure fluid required to inflate them, an axially disposed air pipe is built up within the heater press, by connecting one pipe section upon another as the molds are put in. A vertical threaded stud 41 is fixed to the top plate 18 of the ram head in an axial position. A pipe section 42 is connected in a vertical position on said stud,—and other similar pipe sections are successively added to the air pipe,—one for each mold. Each pipe section as shown comprises an upper pipe 42$^a$, a lower pipe 42$^b$, and an intermediate pipe T42$^c$ into which these pipes screw. Each pipe T carries a radially extended delivery pipe 43, of suitable length; and the usual or any suitable means are provided for making an operative connection between each air valve and the associated delivery pipe. Preferably the lower pipe 42$^b$ is formed with a flange, and carries a threaded coupling nut 44, which engages the flange and screws onto the upper end of the upper pipe 42$^a$ of the pipe section below it. Preferably the meeting ends of the two pipes 42$^a$ and 42$^b$ of adjacent pipe sections are formed with ground joints which are drawn into air tight contact when the coupling nut is tightened. It is clear that with the described construction the delivery pipes 43 may be of substantially the same length,— may be made to extend in any radial direction from the air pipe toward the valve stems with which they are to be connected, and may be easily and quickly connected therewith, without elongating or bending said supply pipe.

The molds are successively put into the heater, are centered by the means provided for that purpose, and successively there is added to the air pipe a section until the heater is as full as desired. Then the top 12 of the heater is lowered so that it rests upon the top of the cylinder. A threaded pipe 45 may pass axially through this head and is connected with the upper section 42. Any suitable connections may be made with the projecting upper end of this pipe. When the parts have been connected up as stated the top 12 of the heater is lowered and secured upon the heater, and the ram is raised; and the entire accurately centered column or pile of molds is thereby clamped together between the ram head and the heater top 12. When this has been accomplished then the pressure fluid at required pressure is blown into the axially disposed fluid pressure supply pipe, and from thence flows through the several distributing pipes 43 into the various air bags, thereby inflating them to the proper degree. This being accomplished the heating fluid, as for example, steam, is allowed to enter the heater,— the steam connections being no part of the present invention, and therefore not shown.

As before stated, the heater press may be easily adapted for use with molds of different size by the substitution of one plate 18 for another plate having on its top surface a centering rib of the proper diameter. These plates 18 should, however, be placed accurately upon the ram head. To facilitate the doing of this and to avoid the making of any permanent connection between the removable plate and the ram head the latter is provided with an annular centering rib 15$^a$, and each of the removable plates 18 is provided on its lower face with a centering groove 18$^a$ adapted to fit upon the rib 15$^a$. It is obvious that the length of the air supply pipe sections and the length of the radial branch pipes carried thereby must be varied in accordance with the thickness and diameter of the molds with which they are associated. With that understanding it is clear that molds of various diameters and thicknesses may be piled concentrically upon one another, and may be placed in said heater press at the same time, provided that they are all arranged coaxially with respect to the air supply pipe, and provided of course the air supply pipe sections and the radial branches thereof are of proper length for the particular molds with which they are associated.

While the described invention, in what I believe to be its best form, permits the use of stiff radial branch pipes leading from the axially disposed air pipe to the air bag valves, the use of such stiff straight radial pipes is not essential. Nor is it essential that these pipes extend in an exact radial direction from the central supply pipe to the air pipe valve.

Various changes may be made in the specific embodiment of the invention shown and described herein, provided the means stated in any of the following claims or the equivalents of such stated means be employed.

Having described my invention, I claim:

1. The combination of a heater press having a removable cover and containing a vertically movable ram head for supporting a pile of molds, a vertically arranged fluid supply pipe fixed to said ram head and composed of a plurality of separable sections each carrying a radial branch pipe, and a plurality of two part molds arranged in a pile upon said ram concentrically with respect to said vertical fluid supply pipe, said cover having a coaxial hole through it and said fluid supply pipe having its upper end projected through said hole.

2. The combination of a heater press having a removable cover and containing a vertically movable ram head for supporting a pile of molds, the upper surface of said ram head being provided with mold centering means, a pile of molds supported upon one another with the bottom mold resting upon said ram head, each mold comprising two separable halves in the meeting faces of which is an annular tire recess,—the upper half of each mold being provided with centering means similar to the centering means on the top of the ram head and the lower half of each mold being provided with centering means adapted to engage the centering means upon the support therefor, said centering means being constructed to cause the pile of molds to assume coaxial positions when the opposed faces of the several molds are forced into contact, a coaxially arranged fluid supply pipe fixed to said ram head, and composed of a plurality of separable sections each carrying a radial branch pipe.

3. The combination of a heater press having a removable cover, and containing a vertically movable ram head for supporting a pile of molds, the upper surface of said ram head being provided with mold centering means, a pile of concentrically arranged two part molds supported upon one another with the bottom mold resting upon the ram head and engaging the mold centering means thereon, a vertical sectional fluid supply pipe disposed coaxially within said pile of molds, branch pipes extending from said coaxially arranged supply pipe to the several molds, means for maintaining said central supply pipe substantially in the coaxial position referred to, and a fluid pressure supply pipe which is separably connected with the upper end of the coaxially disposed fluid supply pipe.

4. The combination of a heater press having a removable cover and containing a vertically movable ram head for supporting a pile of molds, a vertically arranged fluid supply pipe fixed to said ram head and composed of easily separable sections, branch pipes leading from said fluid supply pipe to the several molds, a plurality of two part molds arranged in a pile upon said ram head coaxially with respect to said vertical fluid supply pipe,—the removable cover of the heater press having a coaxial hole through it and said vertical fluid supply pipe having its upper end projecting through said hole.

In testimony whereof, I hereunto affix my signature.

BENJAMIN H. ROSE.